(12) United States Patent
Abidi et al.

(10) Patent No.: US 10,048,975 B2
(45) Date of Patent: *Aug. 14, 2018

(54) SCALABLE POLICY MANAGEMENT IN AN EDGE VIRTUAL BRIDGING (EVB) ENVIRONMENT

(71) Applicant: INTERNATIONAL BUSINESS MACHINES CORPORATION, Armonk, NY (US)

(72) Inventors: Vasmi M. Abidi, Cupertino, CA (US); Chandramouli Radhakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,508

(22) Filed: Aug. 17, 2016

(65) Prior Publication Data

US 2016/0357591 A1 Dec. 8, 2016

Related U.S. Application Data

(63) Continuation of application No. 14/078,385, filed on Nov. 12, 2013, now Pat. No. 9,471,351, which is a (Continued)

(51) Int. Cl.
*G06F 9/455* (2018.01)
*H04L 12/64* (2006.01)
*H04L 29/08* (2006.01)

(52) U.S. Cl.
CPC ...... *G06F 9/45533* (2013.01); *G06F 9/45558* (2013.01); *H04L 12/6418* (2013.01); *H04L 67/16* (2013.01); *G06F 2009/45595* (2013.01)

(58) Field of Classification Search
CPC .................................................. G06F 9/45533
(Continued)

(56) References Cited

U.S. PATENT DOCUMENTS 7,385,973 B1 * 6/2008 Johnson .............. H04L 12/4675
370/389
8,417,800 B2 * 4/2013 Shah ................. G06F 17/30345
709/220
(Continued)

FOREIGN PATENT DOCUMENTS

CN 102316001 A 1/2012

OTHER PUBLICATIONS

U.S. Notice of Allowance for U.S. Appl. No. 13/846,724 dated Aug. 25, 2016.
(Continued)

*Primary Examiner* — Mehran Kamran
(74) *Attorney, Agent, or Firm* — Sherman IP LLP; Kenneth L. Sherman; Steven Laut

(57) ABSTRACT

A method includes validating, by a switch, a message including virtual machine (VM) information using a value of a virtual station interface (VSI) type identification (ID) to perform a lookup of a fetched VSI database. The VM information for the VM comprises VSI type ID and virtual local area network (VLAN) ID. The switch retrieves an address of the VM from a first table for multiple different VM types based on using VSI type ID and network ID. The switch retrieves rules associated with the retrieved address of the VM and the VSI type ID from a second table including VM information. The switch applies the associated rules for the VM.

20 Claims, 7 Drawing Sheets

Related U.S. Application Data continuation of application No. 13/846,724, filed on Mar. 18, 2013.

(58) Field of Classification Search
USPC .............................................. 718/1
See application file for complete search history.

(56) References Cited

U.S. PATENT DOCUMENTS

| | | | |
|---|---|---|---|
| 8,458,379 B2 | 6/2013 | Ueno et al. | |
| 8,990,808 B2 | 3/2015 | Nakagawa | |
| 2007/0140263 A1* | 6/2007 | Mitome | H04L 12/4645 370/395.53 |
| 2009/0276774 A1* | 11/2009 | Kinoshita | G06F 21/6218 718/1 |
| 2010/0128605 A1* | 5/2010 | Chavan | H04L 47/10 370/230.1 |
| 2011/0004877 A1* | 1/2011 | Wu | G06F 9/455 718/1 |
| 2011/0029971 A1* | 2/2011 | Yamasaki | G06F 9/45558 718/1 |
| 2011/0238969 A1* | 9/2011 | Warkentin | G06F 9/441 713/2 |
| 2012/0023492 A1* | 1/2012 | Govindan | G06F 9/5083 718/1 |
| 2012/0063363 A1* | 3/2012 | Li | H04L 12/4645 370/255 |
| 2012/0063466 A1* | 3/2012 | Sultan | H04L 12/4645 370/401 |
| 2012/0185846 A1* | 7/2012 | Recio | G06F 9/5077 718/1 |
| 2012/0239831 A1* | 9/2012 | Ueno | H04L 67/32 710/33 |
| 2012/0260250 A1* | 10/2012 | Maeda | G06F 21/53 718/1 |
| 2012/0304171 A1* | 11/2012 | Joshi | G06F 9/45558 718/1 |
| 2012/0331465 A1* | 12/2012 | Tanikawa | G06F 9/5077 718/1 |
| 2013/0021944 A1* | 1/2013 | Li | H04L 12/4645 370/254 |
| 2013/0031544 A1* | 1/2013 | Sridharan | G06F 11/203 718/1 |
| 2013/0152076 A1* | 6/2013 | Patel | G06F 9/45558 718/1 |
| 2013/0235870 A1* | 9/2013 | Tripathi | H04L 41/5019 370/390 |
| 2013/0298126 A1* | 11/2013 | Nakagawa | G06F 9/455 718/1 |
| 2014/0064056 A1* | 3/2014 | Sakata | H04L 41/00 370/216 |
| 2014/0282523 A1 | 9/2014 | Abidi et al. | |

OTHER PUBLICATIONS

Ghanwani, A. et al., "Bridge Assigned VSI Type IDs for VDP", bg-ghanwani-bridge-vsi-0710-v2, Jul. 2010, pp. 1-12, Brocade, USA.

Mell, P., et al., "The NIST Definition of Cloud Computing", National Institute of Standards and Technology Special Publication 800-145, Sep. 2011, pp. 1-7, U.S. Department of Commerce, United States.

Non-Final Office Action for U.S. Appl. No. 13/846,724 dated Jan. 16, 2015.

U.S. Final Office Action for U.S. Appl. No. 13/846,724 dated May 15, 2015.

U.S. Advisory Action for U.S. Appl. No. 13/846,724 dated Aug. 3, 2015.

U.S. Non-Final Office Action for U.S. Appl. No. 14/078,385 dated Jan. 15, 2015.

U.S. Final Office Action for U.S. Appl. No. 14/078,385 dated May 15, 2015.

U.S. Advisory Action for U.S. Appl. No. 14/078,385 dated Jul. 31, 2015.

U.S. Notice of Allowance for U.S. Appl. No. 14/078,385 dated Jun. 28, 2016.

\* cited by examiner

SCALABLE POLICY MANAGEMENT IN AN EDGE VIRTUAL BRIDGING (EVB) ENVIRONMENT

BACKGROUND

In EVB (Edge Virtual Bridging) environments, policies and attributes are specified for a particular virtual station interface (VSI) type identification (ID) (VSI-TYPE-ID). The policies are stored in a central configuration database called the VSI database (VSI-DB). These policies could have actions, such as metering incoming packets, metering outgoing packets, deny and/or permit certain packets streams (filter) based on the nature of a virtual machine (VM). Ternary content addressable memory (TCAM) devices are used to implement rules and policies in hardware.

SUMMARY

Embodiments relate to scalable policy management in an edge virtual bridging (EVB) environment. One embodiment includes validating, by a switch, a message including virtual machine (VM) information using a value of a virtual station interface (VSI) type identification (ID) to perform a lookup of a fetched VSI database. The VM information for the VM comprises VSI type ID and virtual local area network (VLAN) ID. The switch retrieves an address of the VM from a first table for multiple different VM types based on using VSI type ID and network ID. The switch retrieves rules associated with the retrieved address of the VM and the VSI type ID from a second table including VM information. The switch applies the associated rules for the VM.

These and other features, aspects and advantages of embodiments will become understood with reference to the following description, appended claims and accompanying figures.

DETAILED DESCRIPTION

Figure 1:
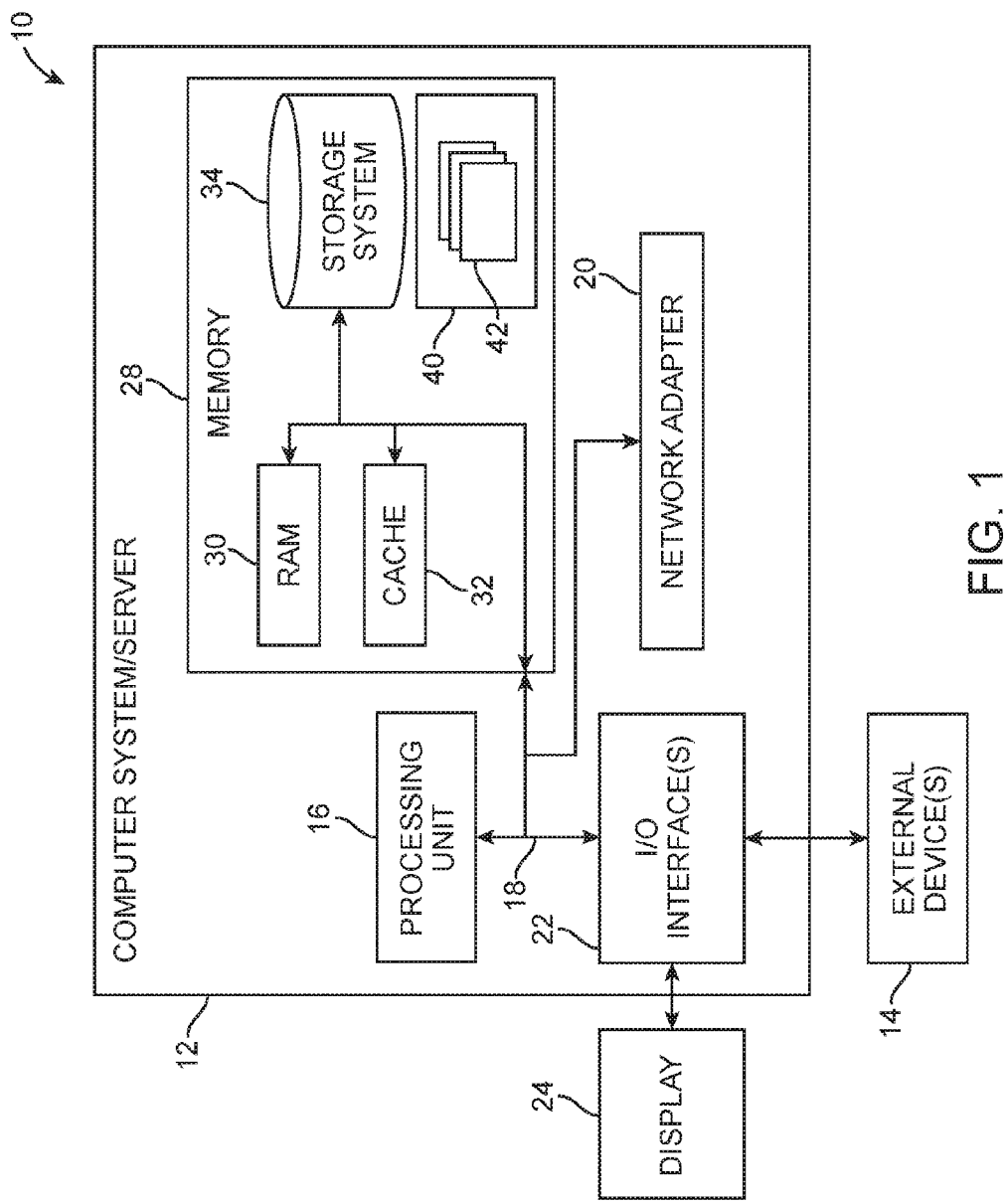
FIG. 1 depicts a cloud computing node according to an embodiment.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

The embodiments may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
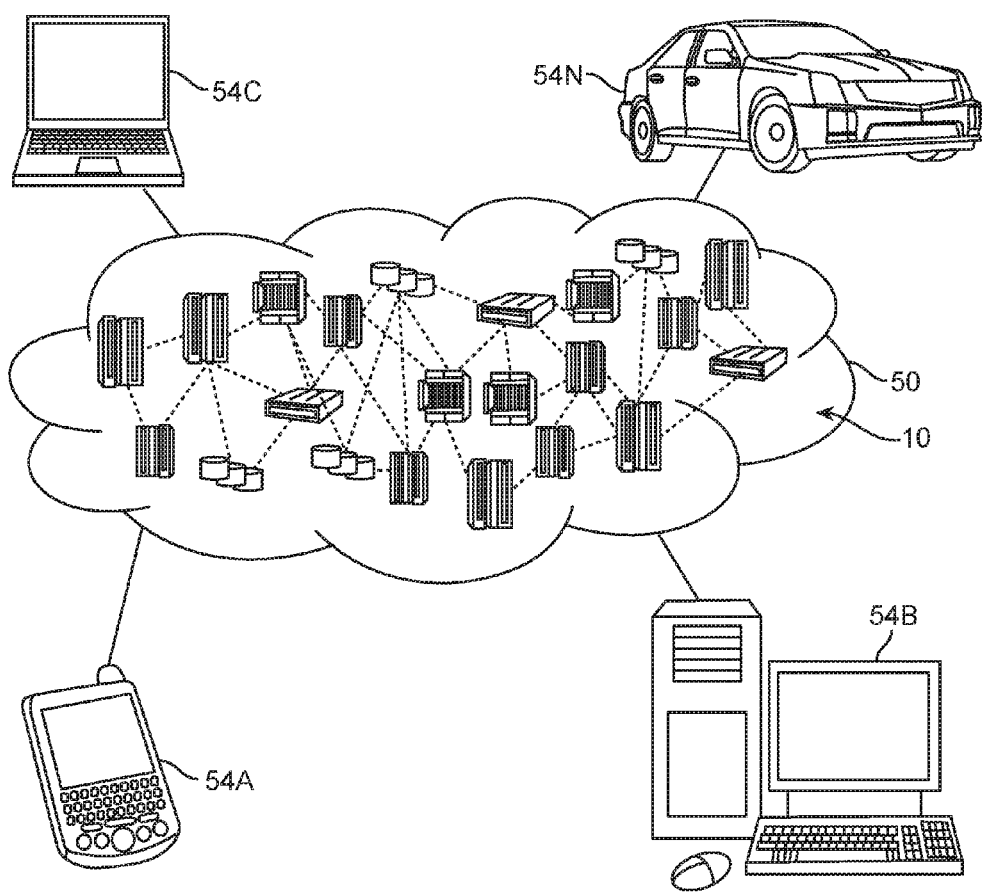
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
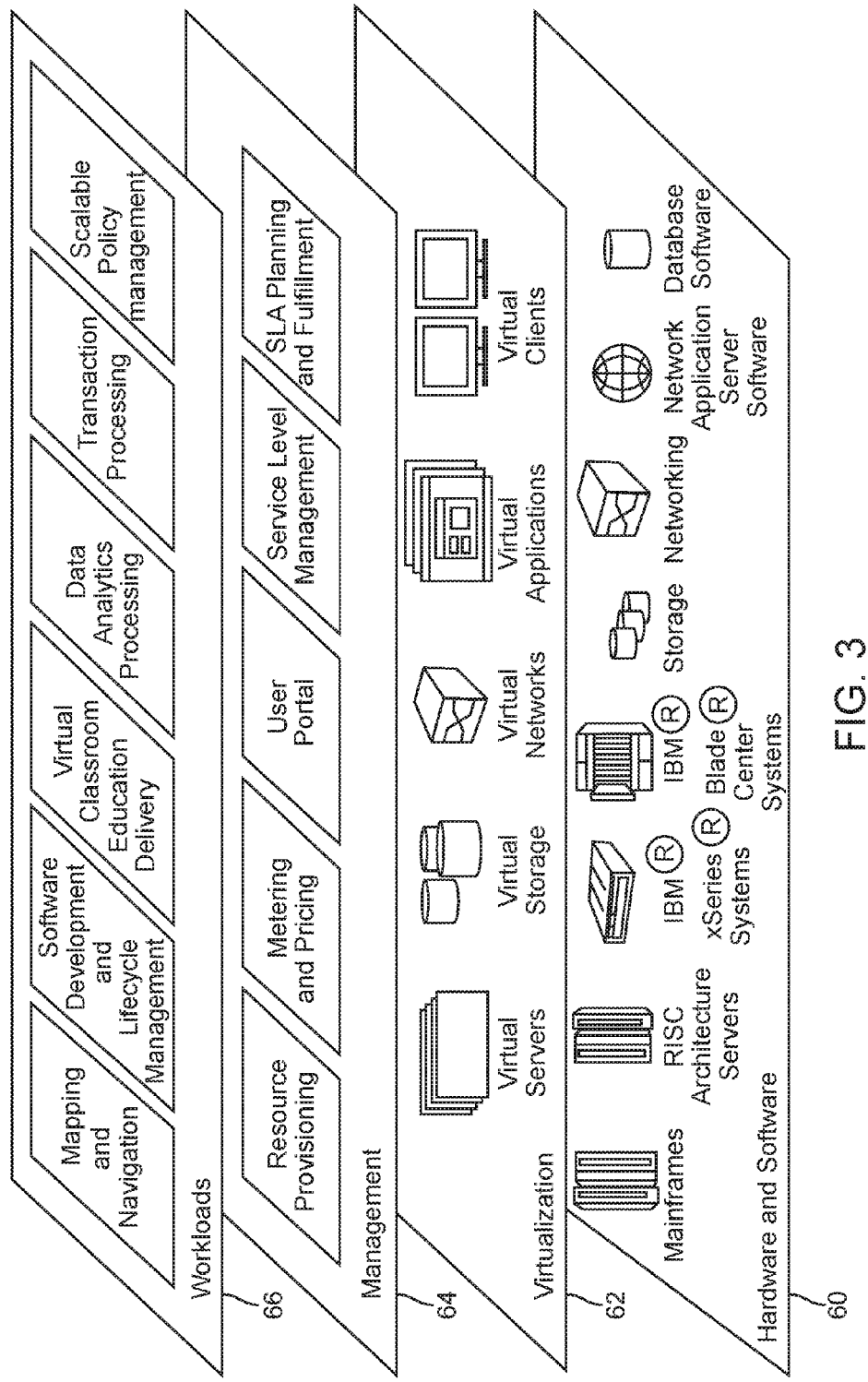
FIG. 3 depicts an abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and scalable policy management. As mentioned above, all of the foregoing examples described with respect to FIG. 3 are illustrative only, and the embodiments are not limited to these examples.

It is understood all functions of the embodiments as described herein are typically performed by the scalable management policy system 500 (FIG. 5), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments are intended to be implemented with any type of clustered computing environment now known or later developed.

According to an embodiment, a scalable policy management process in an EVB environment implemented by the system 500 comprises fetching information from a VSI database. A first table is generated with at least a portion of the information from the VSI database. A message is received including VM information for a created VM. A second table is generated including at least a portion of the VM information. A VM ID is retrieved based on VM type from the first table. Rules associated with the retrieved VM ID are retrieved from the second table. The associated rules for the VM are applied. The embodiments scale with policy rules associated with added VMs since the resources required (e.g., TCAMs) for the replication of policy rules is proportional to the size of the second table (e.g., VSI-DB table) rather than the number of VMs.

Figure 4:
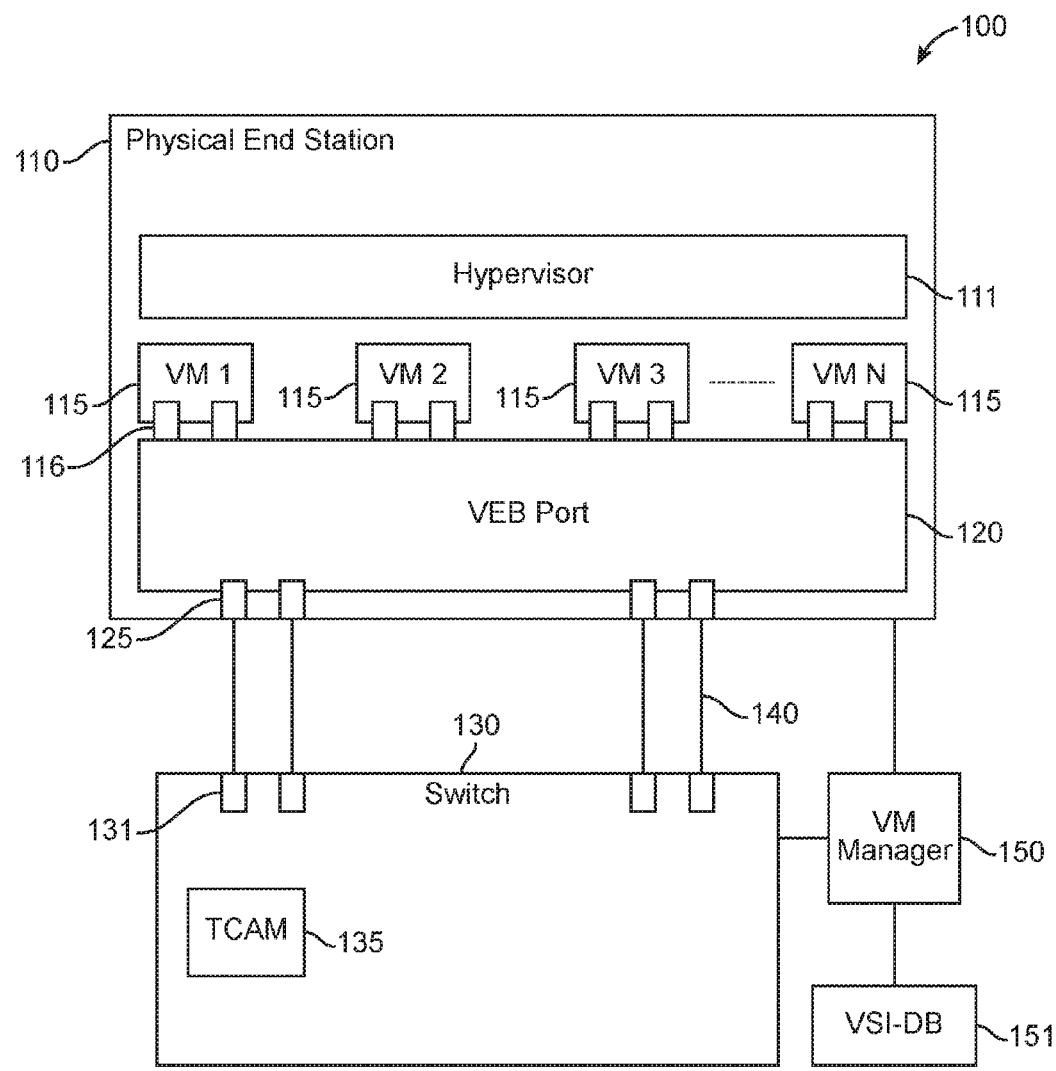
FIG. 4 is a block diagram illustrating an EVB system for employing an embodiment.

FIG. 4 shows a block diagram illustrating an EVB system 100 for employing an embodiment. EVB system 100 includes a physical end station 110 that includes a hypervisor 111, VM 1 115 to VM N 115, virtual edge bridge (VEB) port 120. The VMs 1-N 115 include virtual interfaces 116 (e.g., virtual network interface card (VNIC), or VM NIC), applications, and operating systems. The VEB port 120 includes physical NICs 125 and communicates (e.g., ingress and egress) information (e.g., system traffic, network traffic, data, messages, etc.) with switch 130 (e.g., an adjacent bridge) through a VEB uplink 140 via switch ports 131.

The switch 130 may have one or more TCAMs 135 that are used for implementing EVB policies (e.g., metering rules, access rules, etc.) in hardware. The VSI-DB 151 stores the EVB policies. The VM manager (e.g., server) 150 retrieves the EVB policies for association with a VM via the hypervisor 111, which transmits a VSI discovery protocol (VDP) associate message to the switch 130 for employing the policy rules using the TCAM 135. A VM 115 is associated with a particular VSI-TYPE-ID when it becomes active as part of the VDP protocol. Many of the VMs 1-N 115 may use the same VSI-TYPE-ID. In order to identify the VSI-TYPE-ID, it is essential that the TCAM rules include the VM 115 identification (media access control (MAC) address) to enforce/implement the correct policy. Therefore, the TCAM 115 rules may be replicated for each VM 115. Using the TCAM 135 mechanisms (e.g., look-ups, operations, etc.) does not scale since an increase in the number of TCAM rule replications for each VM 115 may require addition of more TCAMs 150 to the switch 130.

Figure 5:
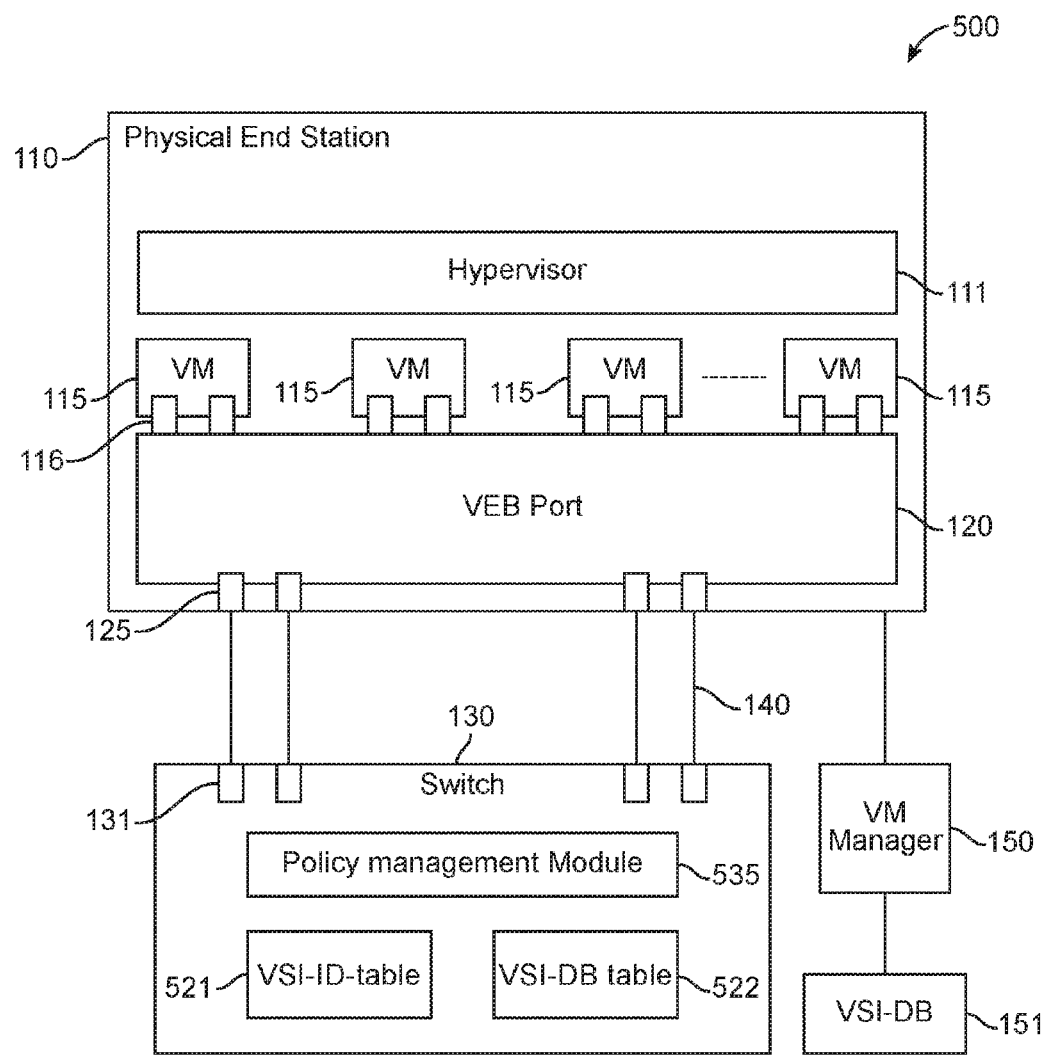
FIG. 5 illustrates a block diagram of an EVB system utilizing scalable policy management, in accordance with an embodiment.

FIG. 5 illustrates a block diagram of an EVB system 500 utilizing scalable policy management, in accordance with an embodiment. In one embodiment, system 500 includes a policy management module 535 that generates a VSI-ID table 521 and a VSI-DB table 522. In one example, the policy management module 535 fetches the VSI-DB from the VM manager 150. The policy management module 535 uses the information (e.g., policies/rules (e.g., access control lists, etc.), transmission and receiving rates for different VM types, and any other pertinent information desired) from the VSI-DB for generating the VSI-DB table 522. In one embodiment, the VSI-DB table 522 is stored in a memory in switch 130. In one example, the memory that the VSI-DB table 522 is stored in may be any type of appropriate hardware memory device, and not necessarily a TCAM type of memory device.

In one embodiment, upon creation of a VM 115, the hypervisor 111 sends a VDP ASSOCIATE message to the switch 130. The ASSOCIATE message includes a value for the VSI-TYPE-ID, the source MAC address and virtual local area network (VLAN) ID (VLAN-ID) for the created VM 115. In one example, the VSI-TYPE-ID may be a number (e.g., 10, 20, 30, etc.). The VSI-TYPE-ID for a VSI determines what policies get applied to the server represented by that VSI at the VEB/VEPA bridge port. In one example, the policies are maintained by the VM Manager 150. In one embodiment, the switch 130 uses the value of the VSI-TYPE-ID for the created VM 115 to perform a lookup of the fetched VSI-DB and validates the association request from the hypervisor 111.

In one embodiment, the policy management module 535 uses the value of the VSI-TYPE-ID, the VLAN-ID and source MAC address of the created VM 115 and generates the VSI-ID table 521. In one example, the VSI-ID table 521 provides a mapping between the VM's 115 source MAC addresses and the VSI-TYPE-ID. In one example, the VSI-ID table 521, once generated, is modified for all created VMs 115. In one embodiment, the switch performs a table look up (TLU) on the VSI-ID table 521 and outputs the source MAC address that is associated with VLAN-ID and VSI-TYPE-ID for the created VM 115. In one embodiment, the output from the VSI-ID table 521 is used as input to the VSI-DB table 522.

In one embodiment, if the VSI-TYPE-ID is created for a first time, then the associated policies are entered (e.g., programmed, manually entered by an administrator, etc.) into the VSI-DB table 522. In one example, the source MAC address of the created VM 115 and VSI-TYPE-ID are input into the VSI-DB table 522 and the rule/policy information for the VM 115 based on the VSI-TYPE-ID is used to store the rule(s)/policy(ies) for the created VMs 115.

Figure 6:
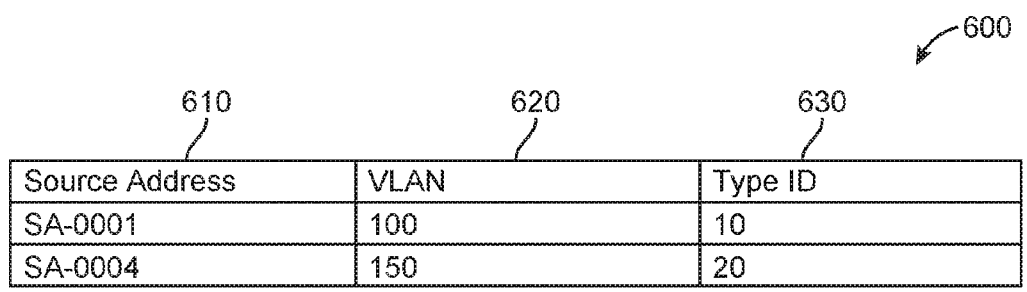
FIG. 6 illustrates a VSI-ID table format, in accordance with an embodiment.

FIG. 6 illustrates a VSI-ID table format 600, in accordance with an embodiment. In one example, the format 600 for the VSI-ID table 521 includes fields for a source MAC address 610, VLAN-ID 620, and VSI-TYPE-ID 630. In one example, the source MAC address 610 may comprise bits for representing the source MAC address 610. In one example, the VLAN-ID 620 may comprise bits for representing a value (e.g., a number, or other representation) for the VLAN that the VM 115 is associated with. In one example, the VSI-ID-TYPE 630 may comprise bits for representing a value (e.g., a number, or other representation) for the VSI type that the VM 115 is associated with.

Figure 7:
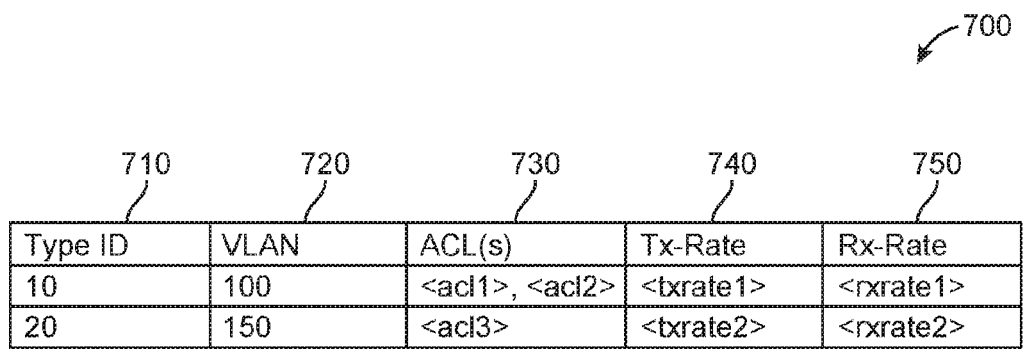
FIG. 7 illustrates VSI-DB table format, in accordance with an embodiment.

FIG. 7 illustrates a VSI-DB table format 700, in accordance with an embodiment. In one example, the format 700 for the VSI-DB table 522 includes fields for a VSI-TYPE-ID 710, VLAN-ID 720, access control lists (ACLs) 730 (e.g., policies/rules), transmission rate 740, and receiving rate 750. In one example, the VSI-TYPE-ID 710 may comprise bits for representing the VSI type associated with a particular VM 115. In one example, the VLAN-ID 720 may comprise bits for representing a value (e.g., a number, or other representation) for the VLAN that the VM 115 is associated with. In one example, the ACLs 730 may comprise bits for representing rules/policies for the VSI type and VLAN type that the VM 115 is associated with. In one example, the transmission rate 740 and receiving rate 750 comprise bits representing the transmission and reception rates for the VM 115 associated with a VSI-TYPE-ID 710 and VLAN-ID 720.

In one embodiment, the scalability for managing policies in the system 500 is readily seen by the following example. For one example, consider twenty (20) VMs 115 are associated with a VSI-TYPE-ID 10, and ten (10) VMs 115 are associated with a VSI-TYPE-ID 20. Without using the system 50 including the policy management module 535, VSI-ID table 521 and VSI-DB table 522, a system, such as system 100, would need to create 50 rules/policies instances (i.e., replicated rules). That is, since the VSI-TYPE-ID 710 for VSI-TYPE is associated with two ACLs 730 (e.g., acl1 and acl2), and there are 20 of these VMs 115, there would be forty (40) instances of the rules/policies for the VMs 115 associated with VSI-TYPE 10. For the VSI-TYPE 20, since there are 10 VMs 115 and only one ACL, there would be 10 instances of the rules/policies for the VMs 115 associated with VSI type 10.

In one embodiment, using the system 500 with the VSI-DB format 700 for a VSI table 522, there are two ACLs 730 (e.g., two rules/policies) that need to be entered in the VSI-DB 522, instead of 50 entries/instances that would be required by system 100. Therefore, the number of bits required to implement the VSI-ID table 521 is much less than ACL entries that would be stored in a TCAM 135 of system 100.

Figure 8:
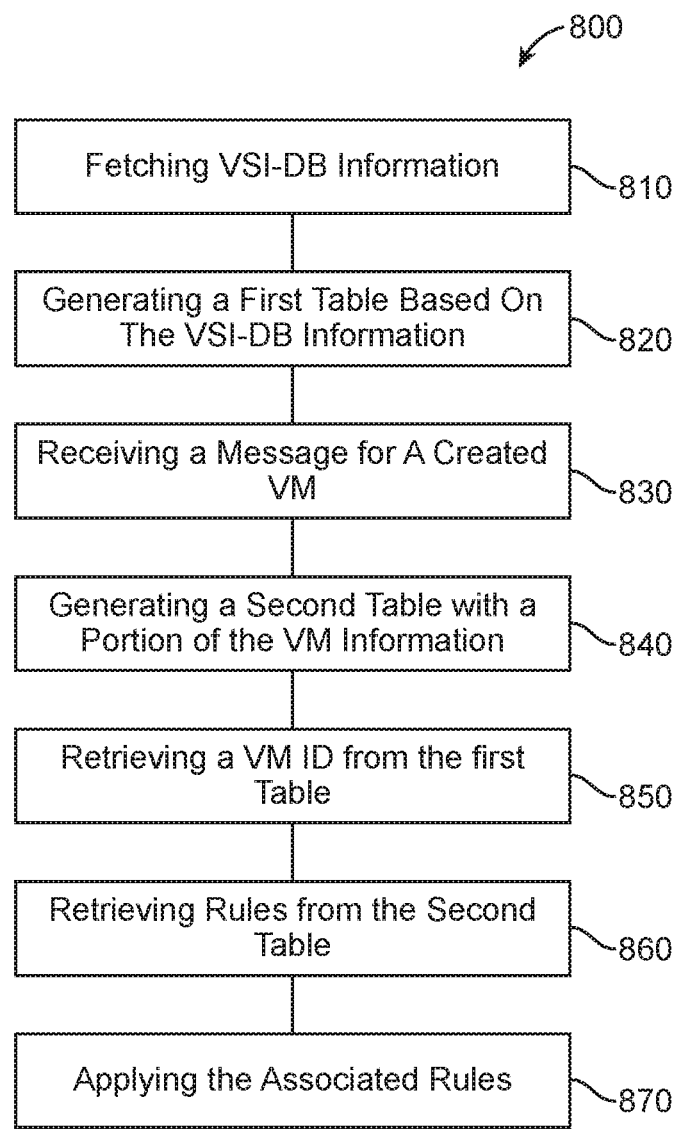
FIG. 8 is a block diagram showing a process for scalable policy management, in accordance with an embodiment.

FIG. 8 illustrates a flowchart of an example process for scalable policy management 800 according to one embodiment. In process block 810, VSI-DB information is fetched, for example, by the switch 130 of system 500 shown in FIG. 5. In process block 820, a first table is generated (e.g., VSI-ID table 521) based on the VSI-DB fetched information, for example, by the policy management module 535 of system 500. In process block 830, a message (e.g., an ASSOCIATE message) is received for a created VM (e.g., VM 115), for example, by the policy management module 535 of switch 130 of system 500. In process block 840, a second table is generated (e.g., VSI-DB table 522) with a portion of the VM information. In process block 850, a VM-TYPE-ID is retrieved from the first table, which may also be associated with a source MAC address. In process block 860, rules/policies (e.g., ACLs 730) are retrieved from the second table, for all rule instances for a particular VM associated with a VSI-TYPE-ID. In process block 870, the rules/policies that were retrieved from the second table are applied and maintained. Therefore, process 800 provides for scaling of rules associated with different VSI-types of VMs based on the size of the second table.

The system 500 may include one or more source programs, executable programs (object code), scripts, or any other entity comprising a set of computer program instructions to be performed. When the system 500 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 500 is implemented in hardware, the system 500 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the embodiments are described below with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments, particularly, any "preferred" embodiments, are merely possible examples of implementations, merely set forth for a clear understanding of the principles of the embodiments.

Many variations and modifications may be made to the above-described embodiment(s) without departing substantially from the spirit and principles of the embodiments. All such modifications and variations are intended to be included herein within the scope of this disclosure and the embodiments and protected by the following claims.

What is claimed is:

1. A method comprising:
   validating, by a switch, a message including virtual machine (VM) information using a value of a virtual station interface (VSI) type identification (ID) to perform a lookup of a fetched VSI database, wherein the VM information for the VM comprises VSI type ID and virtual local area network (VLAN) ID;
   generating, by the switch, a first table for multiple different VM types with at least a portion of information from the VSI database;
   retrieving, by the switch, an address of the VM from the first table for the multiple different VM types based on using VSI type ID and network ID;
   retrieving, by the switch, rules associated with the retrieved address of the VM and the VSI type ID from a second table including VM information; and
   applying, by the switch, the associated rules for the VM.

2. The method of claim 1, wherein the VSI database comprises one or more rules for different VSI types and access rules.

3. The method of claim 2, wherein the first table comprises multiple VSI type IDs each associated with a source address and a VLAN address.

4. The method of claim 3, wherein the second table comprises multiple VSI type IDs associated with one or more access rules.

5. The method of claim 4, wherein the second table further comprises transmission rate information and receiving rate information.

6. The method of claim 1, wherein the switch fetches the information from the VSI database from a server in an edge virtual bridging (EVB) system.

7. The method of claim 1, further comprising:
   generating, by the switch, the second table including the VM information and using information from the VSI database for the multiple different VM types.

8. The method of claim 4, wherein hardware resources for the access rules are proportional to a size of the second table.

9. The method of claim 1, further comprising:
   adding, by the switch, newly created VSI type IDs to the second table along with associated access rules.

10. The method of claim 1, further comprising:
    retrieving VSI type ID from the first table by performing a table look up (TLU) on the first table using the VSI type ID and VLAN ID as input, and outputting a source MAC address for the VM;
    performing a TLU on the second table using output from the TLU on the first table including the source MAC address and the VSI type ID for the VM as input; and
    outputting the associated rules for the VM.

11. A method comprising:
    validating, by a switch, a message including virtual machine (VM) information using a value to perform a lookup of a fetched virtual station interface (VSI) database, wherein the VM information for the VM comprises VSI type identification (ID) and network ID;
    generating, by the switch, a first table including the VM information and using information from the VSI database for multiple different VM types;
    retrieving, by the switch, an address of the VM from a second table based on using VSI type ID and network ID;
    retrieving, by the switch, rules associated with the retrieved address of the VM and the VSI type ID from the first table including VM information; and
    applying, by the switch, the associated rules for the VM.

12. The method of claim 11, wherein the value comprises a VSI type ID, and the second table includes addresses for the multiple different VM types.

13. The method of claim 12, wherein the VSI database comprises one or more rules for different VSI types and access rules, and the second table comprises multiple VSI type IDs each associated with a source address and a VLAN address.

14. The method of claim 13, wherein the first table comprises multiple VSI type IDs associated with one or more access rules.

15. The method of claim 14, wherein the first table further comprises transmission rate information and receiving rate information.

16. The method of claim 11, wherein the switch fetches the information from the VSI database from a server in an edge virtual bridging (EVB) system.

17. The method of claim 11, further comprising:
    generating, by the switch, the second table for multiple different VM types with at least a portion of the information from the VSI database.

18. The method of claim 14, wherein hardware resources for the access rules are proportional to a size of the first table.

19. The method of claim 11, further comprising:
    adding, by the switch, newly created VSI type IDs to the first table along with associated access rules.

20. The method of claim 11, further comprising:
    retrieving VSI type ID from the second table by performing a table look up (TLU) on the second table using the VSI type ID and VLAN ID as input, and outputting a source MAC address for the VM;

performing a TLU on the first table using output from the TLU on the second table including the source MAC address and the VSI type ID for the VM as input; and outputting the associated rules for the VM.

\* \* \* \* \*